(No Model.)  
2 Sheets—Sheet 1.
A. R. CAVNER, Dec'd.
E. E. HOLMAN, Administrator.
LOCOMOTIVE ENGINE.
No. 478,682.  
Patented July 12, 1892.
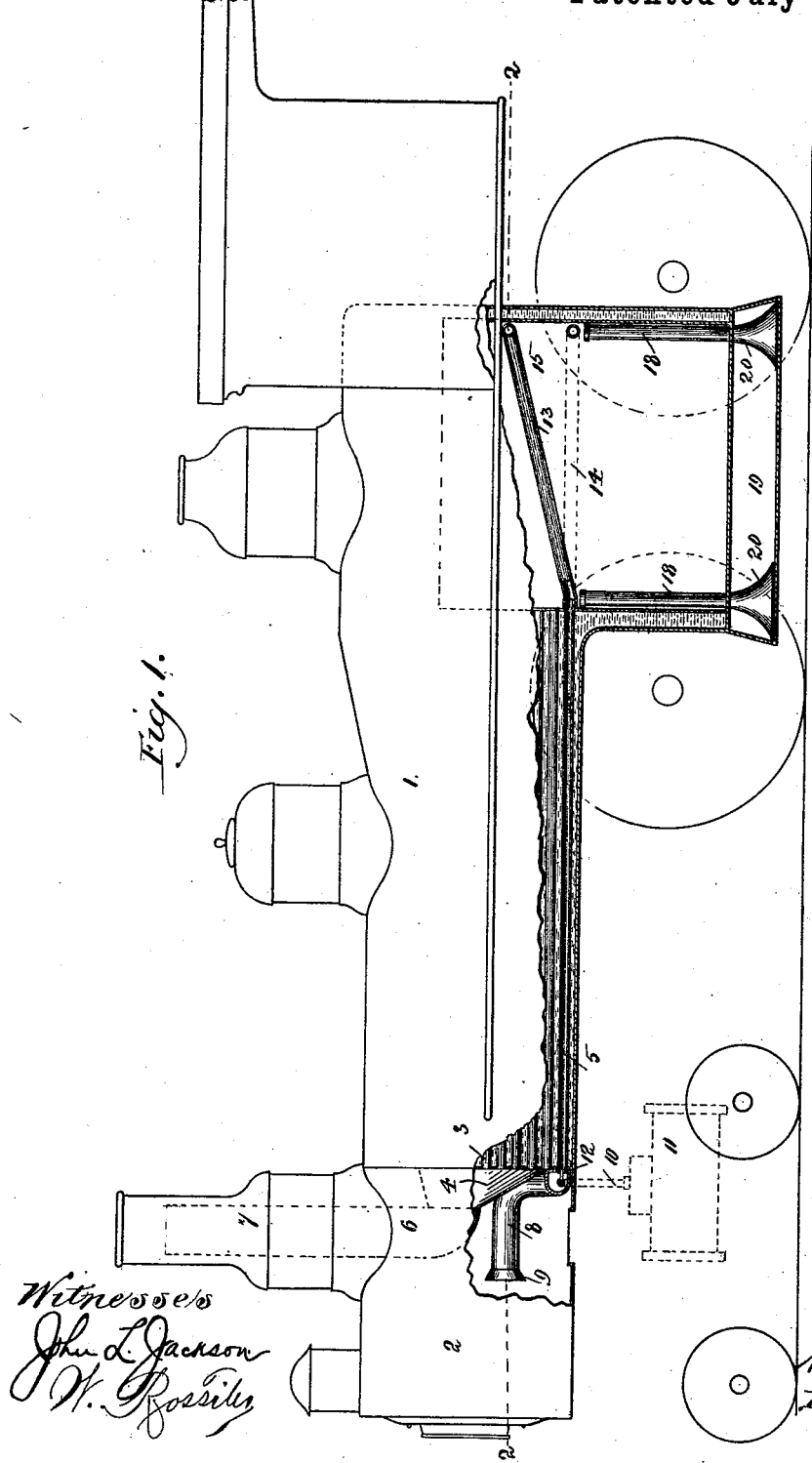
THE NORRIS PETERS CO., PHOTO-LITHO., WASHINGTON, D. C.

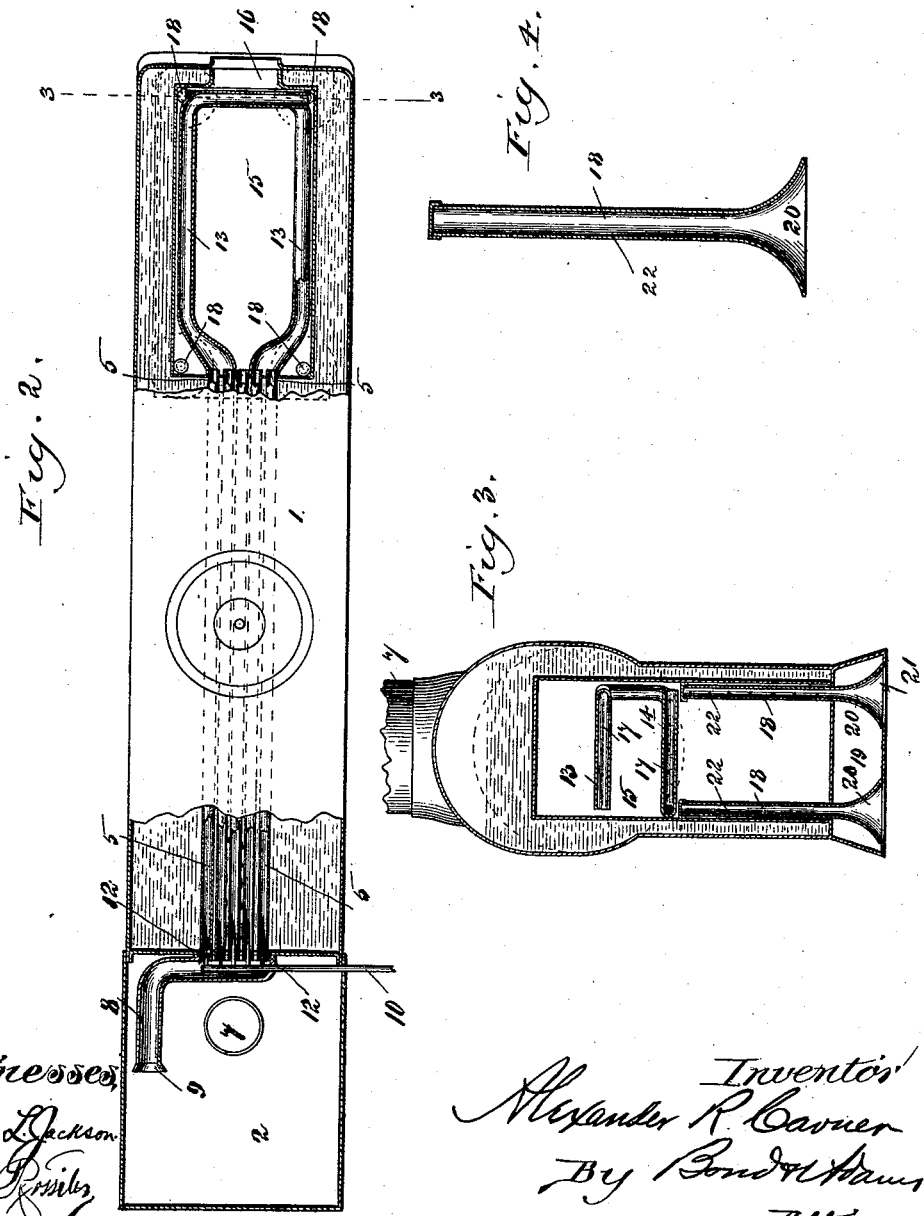

UNITED STATES PATENT OFFICE.

ALEXANDER R. CAVNER, OF CHICAGO, ILLINOIS; EDWARD E. HOLMAN, ADMINISTRATOR OF SAID ALEXANDER R. CAVNER, DECEASED, ASSIGNOR TO THE CAVNER LOCOMOTIVE IMPROVEMENT COMPANY, OF SAME PLACE.

LOCOMOTIVE-ENGINE.

SPECIFICATION forming part of Letters Patent No. 478,682, dated July 12, 1892.

Application filed August 1, 1891. Serial No. 401,433. (No model.)

*To all whom it may concern:*

Be it known that I, ALEXANDER R. CAVNER, a citizen of the United States, residing at Chicago, in the county of Cook and State of Illinois, have invented certain new and useful Improvements in Locomotive-Engines, of which the following is a specification, reference being had to the accompanying drawings, in which—

Figure 1 is a side elevation of an engine, a portion of the side being broken away to show my improvements. Fig. 2 is a horizontal cross-section on line 2 2 of Fig. 1. Fig. 3 is a vertical cross-section on line 3 3 of Fig. 2; and Fig. 4 is an enlarged detail, being a vertical section of one of the supply-tubes.

My invention relates to locomotive-engines provided with apparatus for producing a draft through the furnace, and more particularly to locomotives of this class having a compartment in front of the boiler.

The object of my present invention is to provide improved means for supplying the furnace with fresh air and to create a forced draft through the furnace. I accomplish this object as hereinafter specified and as illustrated in the drawings.

That which I regard as new will be pointed out in the claims.

In the drawings, 1 indicates a locomotive having a forward compartment 2. The compartment 2 has suitable openings to admit a supply of air into it.

3 indicates the flues of the boiler, which may be of the usual construction.

4 indicates a hood, which is placed over the end of the boiler which opens into the compartment 2 and is of such size as to cover all the flues except the lowermost row, which I have marked 5 in the drawings. The hood 4 is connected by means of a suitable tube 6 with the smoke-stack 7 of the locomotive. The tube 6 opens into the smoke-stack near its upper end, as shown by dotted lines in Fig. 1.

8 indicates a tube, which is preferably of the shape shown in Fig. 2, having a flaring mouth 9, opening into the compartment 2, and being bent to the shape shown. The inner end of the tube 8 incloses the lowermost flues 5 of the boiler, as best shown in Fig. 2.

10 indicates a steam-pipe, which is adapted to conduct exhaust-steam from one of the cylinders 11 of the locomotive and extends into the pipe 8 and across the ends of the flues 5. Jets 12 extend from the pipe 10 into each of the flues 5, as best shown in Fig. 2.

13 and 14 indicate pipes, which communicate with the inner ends of the flues 5 and extend around the edges and across the end of the fire-box, as best shown in Fig. 2. Each of the pipes 13 and 14 preferably consists of a single pipe bent to the shape shown and connected at its opposite ends to the flues 5. The pipe 14 extends in a horizontal direction across the fire-box and is about upon a level with the bottom of the furnace-door 16. The pipe 13 is upwardly inclined, so that the portion farthest from the ends of the flues 5 will be over the door 16. The door 16 may be of any usual construction. The transverse portions of the pipes 13 and 14 which are over and under the door 16, respectively, are provided with perforations 17, opening into the furnace, as best shown in Fig. 3.

18 indicates supply-tubes, which are flared at the bottom and are located in a perpendicular position in the fire-box, a pipe 18 being preferably placed at each corner of the fire-box. The lower ends of the pipes 18 project downward into the ash-box 19 of the furnace and are provided with flared ends 20, as shown. Suitable openings 21 are provided in the ash-box under the ends 20 of the pipes 18. The pipes 18 are provided with perforations 22, which open into the fire-box. By this construction a supply of fresh air may pass upward through the pipes 18 and be delivered through the openings 22 into the furnace.

When the locomotive is in operation, exhaust-steam from the cylinders will pass upward through the pipe 10 and will be delivered through the jets 12 into the flues 5 of the boiler. This will cause a current of air to flow from the compartment 2 through the pipe 8 into the flues 5, whence it will pass back and be delivered into the furnace through the holes 17 in the pipes 13. By this construction a supply of fresh air to the furnace will be constantly provided and a forced draft will be created by the action of the exhaust-steam from the cylinders.

If desired, instead of using the exhaust-steam from only one of the cylinders 11, both cylinders may be connected to the flues 5 in a manner similar to that described, and the current of air flowing through the flues 5 will then be steady instead of intermittent, as would be the case if exhaust-steam from only one cylinder were used.

The number of flues 5 used to carry air to the furnace may be made greater or less, if desired, as it is not essential that any particular number shall be used.

Instead of using exhaust-steam from the cylinders to make the air-current, live steam from the boilers may be used; but the former is preferred.

That which I claim as new, and desire to secure by Letters Patent, is—

1. The combination, with a locomotive, of a boiler, a hood connecting some of the flues of said boiler with the smoke-stack, and devices for causing a current of fresh air to pass through the remaining flues of the boiler into the furnace, substantially as and for the purpose specified.

2. The combination, with a locomotive having a compartment at its front end, of a boiler having a hood which cuts off some of its flues from communication with said compartment and leaves other flues in communication therewith, tubes connected with the locomotive-cylinder for conducting exhaust-steam therefrom into those boiler-flues which communicate with the front compartment for the purpose of causing a current of air to flow through such flues into the locomotive-furnace, and means for supplying fresh air to the front compartment, substantially as described.

3. In a locomotive, the combination, with a boiler and a hood 4, adapted to deliver gases from the boiler into the smoke-stack, of a compartment 2 in front of the boiler, a tube 8, opening into said compartment and being connected to the lowermost flues of the boiler, and devices for causing a current of air to flow through said lowermost flues of the boiler into the furnace of the locomotive, substantially as and for the purpose specified.

4. The combination, with a locomotive-boiler, of an air-compartment arranged at the front end of the boiler in advance of the boiler-flues, a hood which places some of the flues in communication with the smoke-stack and cuts them off from communication with the air-compartment, the remaining flues communicating with said compartment, and means whereby fresh air is conveyed to the furnace from the compartment through the flues which communicate therewith, substantially as described.

5. In a locomotive, the combination, with a boiler and a hood 4, adapted to deliver gases from the boiler into the smoke-stack, of a compartment 2 in front of the boiler, a tube 8, opening into said compartment and being connected to the lowermost flues of the boiler, and a tube leading from the cylinder of the locomotive, said tube having jets 12, substantially as and for the purpose specified.

6. The combination, with a locomotive-boiler, of an air-compartment arranged at the front end of the compartment in advance of the boiler-flues, a hood which places some of the flues in communication with the smoke-stack and cuts them off from communication with the air-compartment, the remaining flues communicating with said compartment, a tube arranged in the air-compartment to conduct air therefrom into some of the boiler-flues, and a steam-pipe for conducting exhaust-steam from one of the locomotive-cylinders into the tube in the air-compartment for causing a current of air to flow into the locomotive-furnace, substantially as described.

7. The combination, with a locomotive, of a boiler having an air-compartment at its front end, tubes arranged to convey fresh air from said compartment to the locomotive-furnace, the inclined tubes 13, having a transverse perforated portion, the tube 14, having a transverse perforated portion, and upright tubes 18, arranged in the fire-box and having their lower ends in direct communication with the external atmosphere, substantially as described.

ALEXANDER R. CAVNER.

Witnesses:
ROBT. B. PORTER,
A. M. MILLER.